United States Patent [19]

Roberts

[11] Patent Number: 4,667,199
[45] Date of Patent: May 19, 1987

[54] SIMULATOR

[75] Inventor: Malcolm E. C. Roberts, Crawley, England

[73] Assignee: Rediffusion Simulation Limited, Crawley, England

[21] Appl. No.: 693,244

[22] Filed: Jan. 22, 1985

[30] Foreign Application Priority Data

Jan. 31, 1984 [GB] United Kingdom ............... 8402486

[51] Int. Cl.$^4$ ............................................. G01S 7/40
[52] U.S. Cl. ...................................... 342/169; 342/26; 434/2; 434/6
[58] Field of Search ................ 343/17.7, 5 W; 434/2, 434/6; 342/26, 169

[56] References Cited

U.S. PATENT DOCUMENTS 4,017,985  4/1977  Heartz ..................................... 434/2
4,493,647  1/1985  Cowdrey ................................. 434/2

Primary Examiner—T. H. Tubbesing
Assistant Examiner—Mark Hellner
Attorney, Agent, or Firm—Laurence R. Brown

[57] ABSTRACT

A simulator for simulating radar or sonar signals returned to an observation point from a three-dimensional object of non-uniform reflectivity. An imaginary three-dimensional object is defined spatially in the form of a series of three-dimensional regularly shaped elements. Each element has allocated to it a predetermined level of uniform reflectivity. The position of boundaries of the element along an imaginary radial line extending from the observation point are calculated and the reflectivity allocated to points on the line on each side of each of the boundary positions is calculated. A sequence of signals is then generated which is representative of the allocated reflectivities occurring along the length of the line.

5 Claims, 7 Drawing Figures

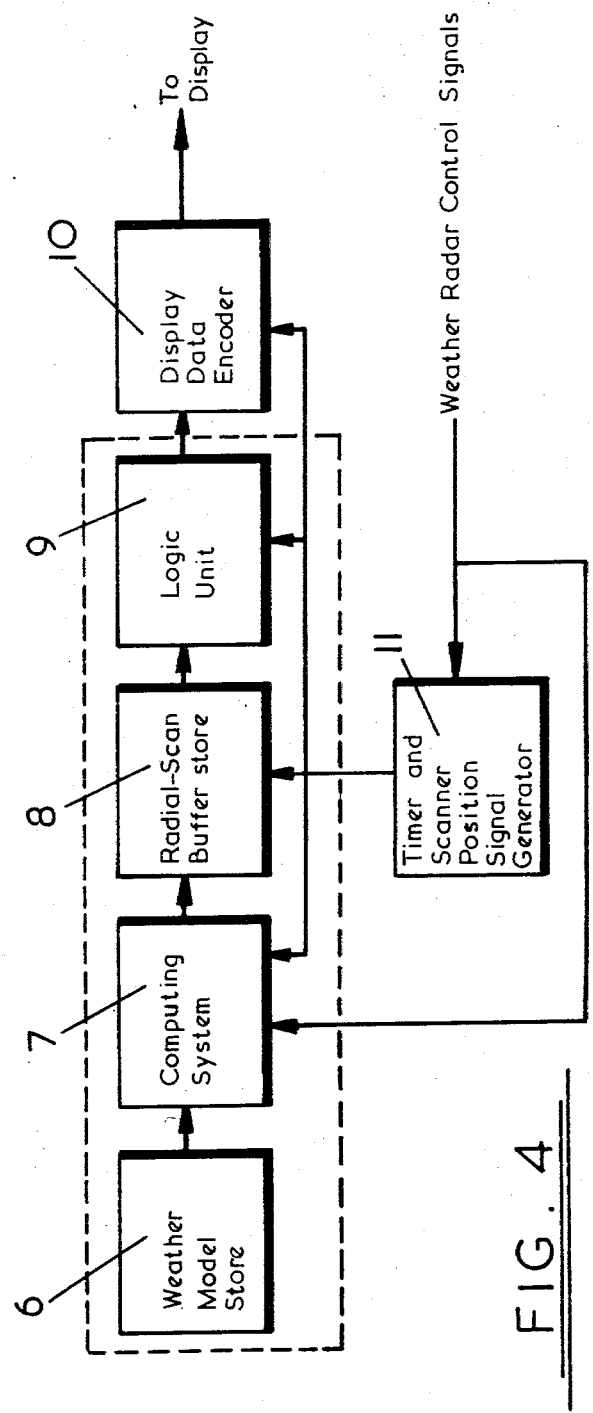
FIG. 4
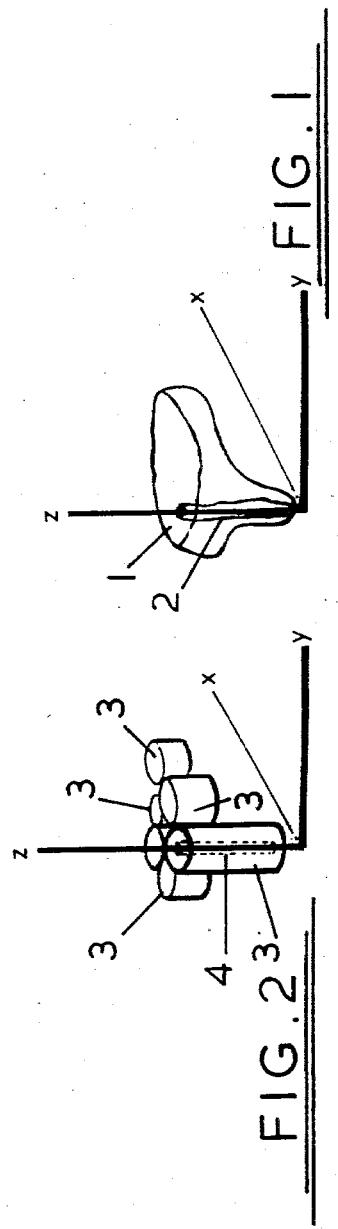
FIG. 1
FIG. 2

SIMULATOR

The present invention relates to a simulator for simulating radar or sonar signals returned to an observation point from a three-dimensional object of non-uniform reflectivity.

Airborne weather radar relies on radar signals returned to the aircraft from concentrations of moisture in the atmosphere to provide an indication of the position of rainstorms. The intensity of the returned signals is dependent upon the density of moisture in the rainstorm. Conventional weather radar displays an image in which the colour varies from a background colour indicative of little or no precipitation, to green for light precipitation, yellow for moderate precipitation, to red for heavy precipitation. It is important to be able to accurately simulate weather radar returns and in regions of moderate or heavy precipitation bad visibility, radio interference and vertical and horizontal windshear effects are experienced to which trainee pilots must become accustomed.

Terrain mapping radars, particularly those designed to provide a display of coastlines or similar features, are also widely used to assist the navigation of aircraft, and again it is important to be able to accurately simulate the returns produced by such radars. Similar sonar equipment is also used on surface and submersible vessels to map the contours of the seabed.

Simulators have been developed for use in weather and terrain mapping radar applications. One basic technique used is to model the three-dimensional object from which returns are to be simulated by storing height data in an approximately rectangular grid form so that, for example, the height of terrain is filed for points spaced apart by six hundred feet in the north-south and east-west directions. Data representative of the reflectivity of the object to be simulated is stored in a second file. Thus the height, shape and reflectivity of the object is defined. A second technique is to store reflectivity data in a rectangular grid form for a number of heights so that horizontal slices at those heights contain contours of radar reflectivity. This second technique is more suited to weather radar simulation since weather radars generally display contours of radar reflectivity through the rainstorms. A third known technique is to store data representative of many rainstorm features which can be re-used and encoded with different heights to construct a complete model of the object to be simulated.

The known techniques outlined above are not satisfactory as they require considerable computing power and also involve considerable programming effort if a wide range of differently shaped objects are to be simulated. Furthermore, any simulator system which does not use standard radar parts normally available could not be easily made physically representative of the standard parts nor would it be easy to integrate the radar simulator with other systems. For example, displayed navigation data would have to be generated by the weather radar simulator. Ideally the image data should be in range/bearing/reflectivity form to avoid the above problems.

It is an object of the present invention to provide an improved simulator which is capable of generating simulated radar returns which are directly equivalent to the actual return signals they are intended to simulate and yet which relies upon a simple object modelling technique.

According to the present invention, there is provided a simulator for simulating radar or sonar signals returned to an observation point from a three-dimensional object of non-uniform reflectivity comprising means for spatially defining an imaginary three-dimensional object relative to the observation point in the form of a plurality of three-dimensional regularly shaped elements, means for allocating to each element a predetermined level of uniform reflectivity, means for calculating the positions of boundaries of the elements along an imaginary radial line extending from the observation point, means for determining the reflectivity allocated to points on the line on each side of each of the calculated boundary positions, and means for generating a sequence of signals representative of the allocated reflectivities occurring along the length of the line.

The invention also provides a method for simulating radar or sonar signals returned to an observation point from a three-dimensional object of non-uniform reflectivity, wherein an imaginary three-dimensional object is spatially defined relative to the observation point in the form of a plurality of three-dimensional regularly shaped elements, a predetermined level of uniform reflectivity is allocated to each element, the positions of boundaries of the elements along an imaginary radial line extending from the observation point are calculated, the reflectivity allocated to points on the line on each side of each of the calculated boundary positions is determined and a sequence of signals is generated representative of the allocated reflectivities occurring along the length of the line.

Some of the elements may overlap in which case means are provided for allocating to each element a predetermined priority such that in regions of overlap between elements the reflectivity corresponds to the reflectivity of the element having the highest priority.

Embodiments of the present invention will now be described, by way of example, with reference to the accompanying drawings, in which:

FIG. 1 is a representation of a storm centre to be modelled;

FIG. 2 is a representation of a model of the storm centre of FIG. 1;

FIG. 4 is a block schematic diagram of a simulator according to the invention;

Figure 3:
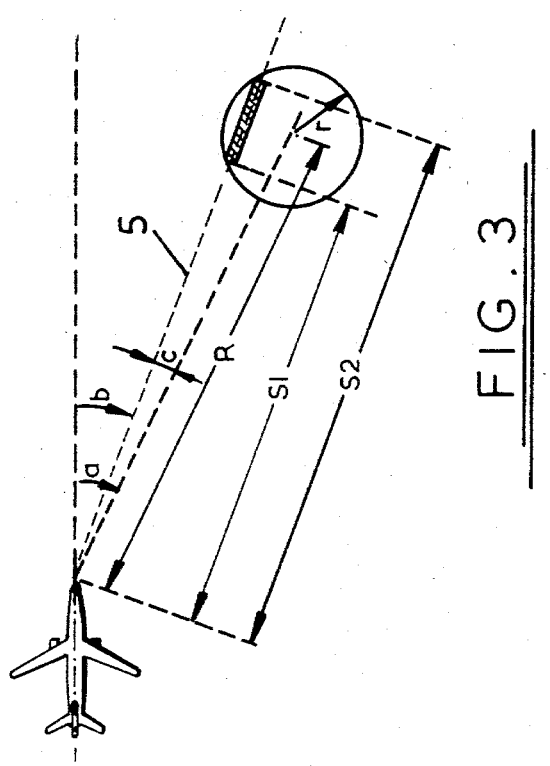
FIG. 3 illustrates the generation of a simulated radar signal from a single cylindrical element.

Referring to the drawings, FIG. 1 illustrates the general form of a typical storm centre having a region 1 of moderate precipitation which is roughly disc shaped except for a downwardly extended portion near its edge and a region 2 of heavy precipitation extending vertically through the region 1 in the downwardly extended portion. FIG. 2 illustrates the general modelling technique used to model the storm centre of FIG. 1. Rather than attempting to precisely define the relatively complex shape of FIG. 1, a model of the storm centre is made up from a series of cylindrical elements 3 which abut but may overlap if necessary and a further cylindrical element 4 which is located wholly within one of the cylinders 3. The elements 3 are allocated a reflectivity equivalent to that associated with moderate precipitation and the element 4 is allocated a reflectivity equivalent to that associated with heavy precipitation.

Data representative of each of the cylindrical elements of the model of FIG. 2 is stored in the form of the x and y coordinates of the vertical axis of the cylinder, the z coordinate of its upper and lower ends, its radius r, and its allocated reflectivity.

FIG. 3 illustrates the process followed in generating a simulated return from one of the cylinders. The flight position and bearing data of the simulated aircraft (the observation point) is provided by the host flight simulator computer. Assuming that the simulated aircraft is flying horizontally and its radar antenna is directed horizontally along radial line 5, the angle a between the flight bearing and the central axis of the element, the angle b between the flight bearing and the line 5, and the distance R between the aircraft and the cylinder axis are calculated. The distances S1 and S2 and the angle c can then also be calculated. Given this information, a stream of data is then generated with individual words—the stream indicating by their content and position within the stream the reflectivity of the regions within and on either side of the element. By scanning across the element a full cross-section can be represented in a manner exactly analagous to an actual radar return. The same process is repeated for various elevations of the scan direction to provide a series of vertically spaced, elliptical slices through the element above and below the horizontal circular slice and a full representation of the model can thus be displayed. Obviously a number of elements can be defined as in FIG. 2 to build up any desired three-dimensional shape. Elements of different reflectivity can be stacked on each other to provide reflectivity changes in the vertical direction. Where two elements of different reflectivity overlap it is necessary to allocate priorities. This can be easily done by for example arranging that the simulated return for a given position represents the highest reflectivity of any two or more overlapping elements within which that position is located. The system defines boundaries of each element and allocates to regions on either side of each boundary the appropriate reflectivity.

FIG. 4 is a schematic illustration of the components of the system. The weather model is defined in a digital store 6 as a series of elements of predetermined position, dimensions and reflectivity. A computing system 7 computes the range and bearing of each element and from this data the ranges S1, S2 (FIG. 3) of the front and back boundaries (i.e. reflectivity transitions) along the current radial scan direction. These ranges are output to a radial scan buffer store 8 where the reflectivity transitions are stored.

The reflectivity transitions are stored in the order of range along the current radial. These transitions are then read from the buffer store in such a manner that the time order of the transitions is the same as the range order of the transitions. Thus the information is in the correct order for radar simulation.

A logic unit 9 converts the transitions to full radar returns of the computed intensity, the intensity being a function of the allocated reflectivity, range of the element, absorption characteristics and radar characteristics.

The output of the logic unit is applied to a display data encoder 10 which converts the computed radar signals to the correct form for the particular radar set being simulated using well known conversion techniques.

A timing and scanner position signal generator 11 provides pulses for synchronising the radar simulator with the radar display, e.g. to simulate turbulence. The generator 11 also provides the radar scanner bearing and elevation, and control signals representing the position of the weather radar controls.

Figure 5:
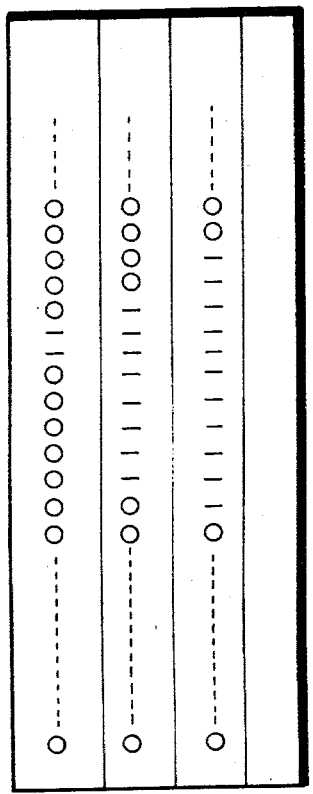
FIGS. 5 and 6 illustrate the operation of the embodiment of FIG. 4.

The buffer store 8 stores data in the form of a start address, range and reflectivity (colour). FIG. 5 schematically illustrates the form in which the data is stored in four bit words, each representing the conditions at a certain range. For the illustrated example, the output of the logic unit 9 will be ---G,Y,Y,Y,Y,Y,R,R,Y,G,G,--; where G equals green, Y equals yellow and R equals red.

The memory has two sections A and B. When one is being used to hold data for the present radial, the other is being used to output data on the previous radial. On the next trigger pulse, these functions are reversed.

In order to prevent the simulated display looking exactly like the model, that is an assembly of cylinders, noise is added to the signal. This makes the individual elements merge into one another to increase the realism of the display.

Figure 6:
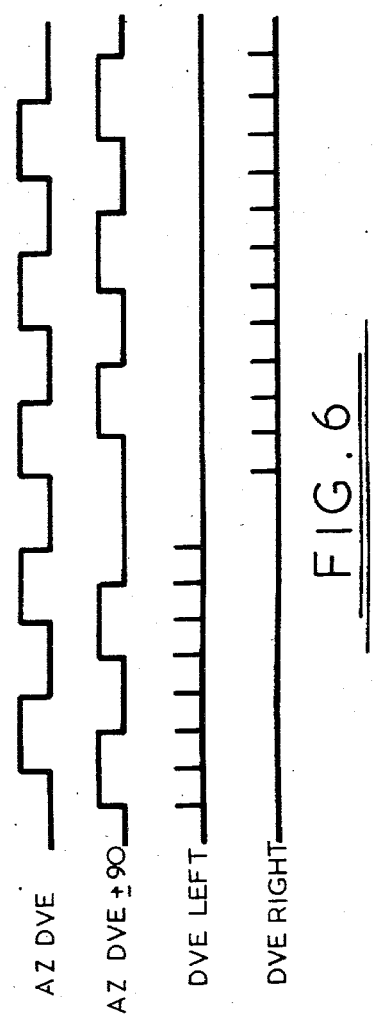

Range switching and other functions of the radar unit are switched in the radar unit by the operator but it is necessary to ensure that the simulator scanner is in step with the radar unit. The radar unit will generally output two stepper motor signals AZ DVE and AZ DVE I 90. In the simulated aircraft, these outputs drive the scanner and keep it in synchronisation with the radar unit. The radar unit also outputs a signal RESOLVER IN which is coupled through the scanner mechanism to produce output XIN which must be of the correct polarity before the indicator will show any display. In the simulator, the two stepper motor signals are converted into two interrupts as shown in FIG. 6.

On the DVE LEFT interrupt the computing system will subtract the angle increment from the value of azimuth stored limiting it to $-80$ degrees. The DVE RIGHT interrupt is similar, but to $+80$ degrees. In this manner the computing system has a current record of the scanner angle, that is angle b in FIG. 3. The sign of this angle is output to the display driver, where it is used to invert or non-invert the RESOLVER IN signal to produce XIN.

If the updating of angle b is stopped, the radar unit will detect it and output a warning to simulate loss of power to the scanner.

The total number of storm elements which can be displayed is a function of the computer speed and the algorithms used. In certain applications it can be assumed that the minimum time allowed per scan is approximately 4 ms and that 1 ms of this time is required for general computer housekeeping. This leaves 3 ms for the main computing loop to be completed for all the elements that affect the current radial scan. Assuming that the average number of computer cycles for the loop is 500, with a computer cycle time of 250 ns the computer can go round the loop 24 times during the 3 ms available. In this case there would probably be up to 24 active elements in range on each radial scan. This number could be increased if required by adapting any one of the following options:

(a) Using a database management system to select the most important elements for each scan;

(b) Using interpolation techniques so that the loop computation can take place over more than one radial scan; or (c) Using multiple processors (since the loop is computation intensive with only a small output data flow, adding a second computer doubles the total possible number of storm elements).

In the horizontal plane, circular cross-section storm elements are convenient as they have the same shape viewed from any direction. However, the simplest shape to generate is a short thick arc of a circle, which if acceptable allows the number of elements to be increased. Other shapes, such as an elliptical cylinder or cone, may be used, but may require more storage in the computer and probably more computing time.

The weather radar simulator described hereinabove can be readily extended to include further effects, including:

(a) Slant range computation
(b) The effect of horizontal beamwidth on the displayed picture
(c) Signal attenuation caused by precipitation and receiver gain and noise characteristics
(d) Ground clutter
(e) Movement of storm elements in space
(f) Effects resulting from the radar scanner being unstable
(g) Iso-echo simulation which shows the transitions only
(h) Turbulence indication mode
(i) Correlation with flight simulation, visual simulation and ground station simulation based on relative positions from the storm elements
(j) Accurate vertical beamwidth simulation, although this would require almost double the computing capacity for the same map detail.

Using some of the abovementioned techniques it is also possible to simulate other effects, e.g. ground returns. This will now be discussed hereinbelow with reference to the simulation of a coastline radar return.

In order to provide for the simulation of cliffs returns the four levels (including zero level) of reflectivity used for weather radar simulation are modified to include an additional level. In each element representing a cliff return the leading edge of the element is accentuated, so that each area of cliff returns is comprised of a series of arcs. This requires some additional computations in the simulation computer, but these should present no problems to a person skilled in the art. To further enhance the radar simulator provision can be made for further accentuating the areas making up the cliff returns when viewed from the seaward side.

The ground return simulator may also make provision for the simulation of general clutter superimposed on the returns. Where a coastline generator is used it will generally be necessary to provide two further generators, one for sea clutter when over sea and the other for general "texturing" of the returns when over land. These would be switched on when appropriate. Two generators are needed as the noise characteristics over land and sea are generally different.

Figure 7:
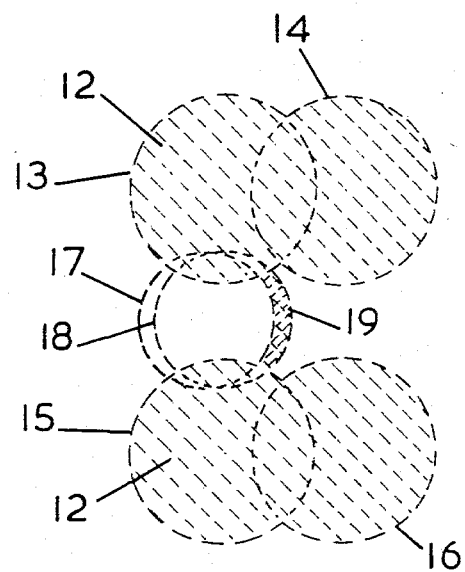
FIG. 7 illustrates the way in which detailed features of terrain may be simulated in accordance with the present invention.

Using the techniques of the coastline generator described above and further, by including a high priority zero level element, it is possible to include in the radar returns features such as bridges. This is achieved by using the high priority zero level element to mask off parts of the higher reflectivity level element. The resultant unmasked portions of the elements can be built up into various terrain features. However, it is necessary, using this technique to give the other elements a choice of two priorities; that is they are either masked by the high priority zero level element or they are not. This technique can be used to provide shadowing on the radar returns. By way of illustration, FIG. 7 shows a simulation of a bridge. The dark "riverbank" areas 12 are formed by elements 13, 14, 15 and 16 which have a higher priority than (and thus blank out) portions of two other elements 17 and 18. Element 18 is darker than elements 13 to 16 but has a lower priority than the elements 13 to 17. A dark "bridge" 19 is thus defined between the "riverbanks" 12.

In the weather radar simulation a narrow vertical beamwidth is satisfactory. However, for terrain the vertical beamwidth must be increased. To this end only the lower beam limit is computed and the upper beam limit is taken as being the horizontal plane in which the aircraft lies. Objects within these two limits generate video signals to the display. The approach is justified because the beam will be wide and the upper limit is generally undiscernable due to range attenuation and grazing angle effects.

In the event that it is necessary to compute the upper beam limit accurately all that is required is a software change, with a small penalty in computing time.

The aircraft control and display devices for the coastline generator and the instructors control and display devices will vary from simulator to simulator, and generally the control signals for the coastline generator will be transferred from the host computer. However, the synchronisation pulses which are required directly for timing purposes will be provided by a separate signal pulse generator.

The weather radar usually does not work in real radar time; this allows more time for processing the individual elements. Similarly, working in time that is slower than real radar time in the coastline generator allows more model elements to be processed. This is helpful but not essential.

The present invention could also be used for simulating sonar returns from the seabed and other similar applications.

The main advantage of the present invention is that data is stored only for significant features and therefore there is considerable compression of data as compared with other simulation methods.

What is claimed is:

1. A simulator for simulating radar or sonar signals returned to an observation point from a three-dimensional object of non-uniform reflectivity, comprising means for spatially defining an imaginary three-dimensional object relative to the observation point in the form of a plurality of three-dimensional regularly shaped elements, means for allocating to each element a predetermined level of uniform reflectivity, means for calculating the positions of boundaries of the elements along an imaginary radial line extending from the observation point, means for determining the reflectivity allocated to points on the line on each side of each of the calculated boundary positions, and means for generating a sequence of signals representative of the allocated reflectivities occurring along the length of the line.

2. A simulator according to claim 1, wherein the or at least some of the elements are overlapping and means are provided for allocating to each element a predetermined priority such that in regions of overlap between elements the reflectivity corresponds to the reflectivity of the element having the highest priority.

3. A simulator according to claim 1, wherein one or more of the elements is of cylindrical shape.

4. A simulator according to claim 1, wherein one or more of the elements is of conical shape.

5. A method for simulating radar or sonar signals returned to an observation point from a three-dimensional object of non-uniform reflectivity, wherein an imaginary three-dimensional object is spatially defined relative to the observation point in the form of a plurality of three-dimensional regularly shaped elements, a predetermined level of uniform reflectivity is allocated to each element, the positions of boundaries of the elements along an imaginary radial line extending from the observation point are calculated, the reflectivity allocated to points on the line on each side of each of the calculated boundary positions is determined and a sequence of signals is generated representative of the allocated reflectivities occurring along the length of the line.

* * * * *